(12) United States Patent
Krijn et al.

(10) Patent No.: US 7,942,537 B2
(45) Date of Patent: May 17, 2011

(54) LIGHT-EMITTING DEVICE WITH BRIGHTNESS ENHANCING LAYER

(75) Inventors: Marcellinus Petrus Carolus Michael Krijn, Eindhoven (NL); Ramon Pascal Van Gorkom, Eindhoven (NL); Michel Cornelis Josephus Marie Vissenberg, Eindhoven (NL); Johannus Gerardus Van Beek, Eindhoven (NL); Lingli Wang, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 683 days.

(21) Appl. No.: 11/916,213

(22) PCT Filed: May 18, 2006

(86) PCT No.: PCT/IB2006/051580
§ 371 (c)(1),
(2), (4) Date: Nov. 30, 2007

(87) PCT Pub. No.: WO2006/129220
PCT Pub. Date: Dec. 7, 2006

(65) Prior Publication Data
US 2008/0192457 A1    Aug. 14, 2008

(30) Foreign Application Priority Data

May 30, 2005   (EP) .................................... 05104598
Oct. 12, 2005   (EP) .................................... 05109499

(51) Int. Cl.
*F21V 9/00*    (2006.01)

(52) U.S. Cl. .......... 362/19; 362/293; 362/231; 362/247; 362/240

(58) Field of Classification Search .................. 362/293, 362/231, 247, 240, 359, 641, 485
See application file for complete search history.

(56) References Cited

U.S. PATENT DOCUMENTS

| | | |
|---|---|---|
| 6,271,902 B1 | 8/2001 | Ogura |
| 6,310,672 B1 | 10/2001 | Koike |
| 6,318,863 B1 * | 11/2001 | Tiao et al. ...................... 353/31 |
| 6,527,411 B1 | 3/2003 | Sayers |
| 6,654,082 B1 | 11/2003 | Sohda |
| 2004/0218390 A1 | 11/2004 | Holman |
| 2005/0002204 A1 | 1/2005 | Lin |
| 2005/0002205 A1 | 1/2005 | Yu |
| 2005/0047135 A1 | 3/2005 | Rhoads |
| 2007/0252923 A1 * | 11/2007 | Hwang et al. .................. 349/65 |

FOREIGN PATENT DOCUMENTS

| | | |
|---|---|---|
| EP | 1439412 | 7/2004 |
| JP | 2004014365 | 1/2004 |
| WO | 0247915 | 6/2002 |

* cited by examiner

*Primary Examiner* — Anabel M Ton
(74) *Attorney, Agent, or Firm* — Larry Liberchuk (57) ABSTRACT

A brightness enhancing means (5), comprising a collimating means (6) having a receiving area (61), an output area (62) being larger than said receiving area (61), and sidewalls (63) at least partially extending between said receiving and output areas, is provided. At least a portion of the sidewalls (63) of said collimating means (6) comprises a first filter being arranged to reflect light of a first light property, which light is received via said receiving area (61) of said first collimating means (6), towards said output area (62) of said first collimating means (6), wherein said first filter is a dichroic filter or a polarization filter.

29 Claims, 7 Drawing Sheets

LIGHT-EMITTING DEVICE WITH BRIGHTNESS ENHANCING LAYER

The present invention relates to a brightness enhancing means, comprising a least a first collimating means and a second collimating means, each having a receiving area, an output area being larger than said receiving area, and side walls extending between said receiving and output areas. The present invention further relates to a light-emitting device comprising a brightness enhancing means.

Planar light sources are currently contemplated for several different applications, such as lamps for environmental illumination, backlights in liquid crystal displays and light sources in projection displays.

Light emitting diodes, LEDs, may be a desirable choice of light sources in many applications, for example as the life time of LEDs are higher than the life time of incandescent bulbs, fluorescent bulbs and discharge lamps.

Further, light emitting diodes are more power consumption efficient than incandescent bulbs and are expected to be more efficient than fluorescent tubes in a near future.

In several of these and other applications, it is often desired to achieve light of high brightness and color variability.

The brightness (B) is defined as being the amount of lumens (Φ) emitted per unit of area (A)

$$B = \frac{\Phi}{A\Omega}.$$

and per unit of solid angle (Ω):

Conventionally, color variability is obtained by arranging independently a number of red, green, and blue LEDs in an array (rows, columns or a two-dimensional matrix) to form an array of color variable, independently addressable, pixels.

Color variable light of high brightness is typically obtained by stacking a high number of high-brightness LEDs, emitting in different parts of the spectrum, side by side in a matrix. The more LEDs being arranged on a certain area, the higher the ratio Φ/A becomes.

However, positioning LEDs that emit different colors side by side in itself is not an efficient way of obtaining light that is collimated as much as possible. Typically, LEDs emits light in an essentially Lambertian pattern, i.e. having an intensity proportional to the cosine of the angle from which it is viewed. Positioning LEDs of different colors side by side will again result in a Lambertian radiation pattern. Thus, the angular spread, proportional to Ω, is unchanged.

One approach to decrease this angular spread is to provide the LEDs with collimators. This is for example described in US patent application 2004/0218390, where the array of LEDs is arranged in a corresponding array of tapered metallic reflecting bins.

However, the tapered metallic bins are space requiring, and in order to provide individual light collimation for each LED, the LEDs have to be arranged in a spaced apart arrangement.

This spaced apart arrangement however has the disadvantage of increasing the A in the formula above, leading to a decrease in brightness for a set number of light emitting diodes.

Thus, there still exists a need for a planar light source, which has a compact layout, capable of providing high-brightness light with a low angular spread of the emitted light.

It is an object of the present invention to overcome this problem, and to provide a light source having a compact layout and being capable of providing collimated light of high brightness.

Thus, in a first aspect the present invention provides a brightness enhancing means comprising at least one collimating means having a receiving area, an output area being larger than the receiving area, and side walls extending between the receiving and output areas.

In the brightness enhancing means of the present invention, at least a portion of the side walls of the collimating means comprises a dichroic filter being arranged to reflect light in a wavelength range, which light is received via said receiving area of said first collimating means, towards said output area of said first collimating means.

In embodiments of the present invention, the brightness enhancing means may comprise at least a first collimating means and a second collimating means, each having a receiving area, an output area being larger than the receiving area, and side walls extending between the receiving and output areas.

At least a portion of the side walls of the first collimating means comprises a first dichroic filter being arranged to reflect light in a first wavelength range, which light is received via said receiving area of said first collimating means, towards said output area of said first collimating means.

At least a portion of the side walls of the second collimating means comprises a second dichroic filter being arranged to reflect light in a second wavelength range, which light is received via the receiving area of the second collimating means, towards the output area of the second collimating means.

Further, the output area of the first collimating means and the output area of the second collimating means are at least partly overlapping.

The first and second wavelength ranges are different, but may partially overlap. However, preferably this range overlap is as small as possible By using collimating means with walls comprising dichroic filters, it is possible to produce such collimating means having overlapping output areas.

The light of the first wavelength range is transmitted through the dichroic filter adapted to reflect light in the second wavelength range (except for overlapping parts of the ranges), but is reflected by the dichroic filter adapted to reflect light of the first wavelength range. Inversely, the light of the second wavelength range is transmitted through the dichroic filter adapted to reflect light in the first wavelength range (except for overlapping parts of the ranges), but is reflected by the dichroic filter adapted to reflect light in the second wavelength range.

By using this approach of the present invention, the color mixing and the collimation of light is performed simultaneously by the same structure, instead of performing the collimation in one structure and thereafter performing the color mixing in another structure (or vice versa).

The present inventors have also found that the above approach may be used to mix and collimate light of different polarization states, for example of different planar polarizations or different circular polarizations.

Thus, in an additional aspect the present invention also relates to brightness enhancing means as described above, but where the first and second wavelength ranges are substituted by a first and a second polarization state, and where the first and second dichroic filters for reflecting light of said first and second wavelength range, respectively, is substituted by a first and second polarization filter for reflecting light of a first and second polarization state, respectively.

Thus, in addition, the present invention provides a brightness enhancing means comprising at least one collimating means having a receiving area, an output area being larger than the receiving area, and side walls extending between the receiving and output areas, wherein at least a portion of the side walls of the collimating means comprises a polarization filter being arranged to reflect light in a polarization state, which light is received via said receiving area of said first collimating means, towards said output area of said first collimating means.

In embodiments of this additional aspect of the present invention, the brightness enhancing means may comprise at least a first collimating means and a second collimating means, each having a receiving area, an output area being larger than the receiving area, and side walls extending between the receiving and output areas, wherein at least a portion of the side walls of the first collimating means comprises a first polarization filter being arranged to reflect light in a first polarization state, which light is received via said receiving area of said first collimating means, towards said output area of said first collimating means, and wherein at least a portion of the side walls of the second collimating means comprises a second polarization filter being arranged to reflect light in a second polarization state, which light is received via the receiving area of the second collimating means, towards the output area of the second collimating means, wherein the output area of the first collimating means and the output area of the second collimating means are at least partly overlapping.

The overlapping output areas allow the manufacture of a compact brightness-enhancing layer, adapted for an array of lighting units having a compact layout.

In the present invention, the angle between the normal to the receiving area and the normal to a portion of the sidewalls of a collimating means that comprises a dichroic filter may be essentially constant, or may increase with the distance from the receiving area.

In embodiments of the present invention the overlap of the output areas of two adjacent collimating means may be at least 10%, such as at least 30%, for example at least 50%.

In embodiments of the present invention, sidewalls of the collimating means may comprise self-supporting wall elements.

In embodiments of the present invention, the dichroic filters may comprise a first dichroic material arranged on a first side of the wall elements and a second dichroic material arranged on a second side of the wall element. The first and the second dichroic materials may be the same or different.

The dichroic filters may for example comprise alternating layers, such as from 5 to about 50 layers, of a first material having a first refractive index and a second material having a second refractive index.

In embodiments of the present invention, a light-blocking means may be arranged on at least part of the output areas of at least part of the collimating means located at a peripheral boundary of said brightness enhancing means.

In embodiments of the present invention, the output areas of at least the two or three collimating means closest to a peripheral boundary of said brightness enhancing means, taken in a direction perpendicular to said peripheral boundary, may extend essentially to said peripheral boundary, i.e. the limits of those output areas may at least partly coincide with said peripheral boundary.

In embodiments of the present invention, at least parts of the sidewalls of collimating means located at a peripheral boundary of the brightness enhancing means, which parts coincide with said peripheral boundary, may be provided with a full-spectrum reflecting surface.

In a second aspect, the present invention provides a light-emitting device comprising a first lighting unit for emitting light of a first wavelength range and a second lighting unit for emitting light of a second wavelength range arranged on a substrate.

The lighting units may for example each comprise one or more light emitting diodes.

A device of the present invention further comprises a brightness enhancing means of the present invention being arranged to receive light emitted by the lighting units.

The brightness enhancing means comprises a collimating means having a receiving area, an output area being larger than said receiving area, and sidewalls at least partially extending between said receiving and output areas. At least a portion of the side walls of the collimating means comprises a dichroic filter being arranged to reflect light of said first wavelength range, which light is received via the receiving area of the collimating means, towards the output area of the collimating means.

In embodiments of the second aspect of the present invention, the brightness enhancing means in the light emitting device may comprise at least a first collimating means and a second collimating means, each having a receiving area, an output area being larger than the receiving area, and side walls extending between said the receiving and output areas.

In the brightness enhancing means, at least a portion of the side walls of the first collimating means comprises a first dichroic filter being arranged to reflect light in the first wavelength range, which light is received via said receiving area of said first collimating means, towards said output area of said first collimating means.

Further, at least a portion of the side walls of the second collimating means comprises a second dichroic filter being arranged to reflect light of the second wavelength range, which light is received via the receiving area of the second collimating means, towards the output area of the second collimating means.

Further, the output area of the first collimating means and the output area of the second collimating means are at least partly overlapping. The first and the second wavelength interval may at least partly overlap.

As mentioned above for the brightness enhancing means, also for a light-emitting device of the present invention, wavelength range may be substituted by polarization state, and dichroic filter may be substituted by polarization filter. Thus, a light emitting device of the present invention may in some embodiments comprise a first lighting unit providing light of a first polarization state and optionally a second lighting unit providing light of a second polarization state, and a brightness enhancing means of the present invention capable of mixing and collimating light of different polarization states.

A light-emitting device of the present invention provides good collimation of light, but also provides good color or polarization mixing. This allows that shadows of objects placed in the beam of the light emitting device will not have colored or polarized edges, which commonly is the case with light sources having not so good color or polarization mixing.

In general embodiments of the present invention, a light emitting device of the present invention comprises a brightness enhancing means of the present invention.

In embodiments of the present invention, the light emitting device may comprise a retarder being arranged on said lighting units, a polarizing reflector being arranged on the retarder, wherein the brightness enhancing means is arranged on the polarizing reflector.

Such a light-emitting device may be used to provide collimated polarized light with high efficiency.

Further, the substrate on which the lighting units are arranged may be a reflective substrate.

In embodiments of the present invention, a collimator may be arranged on the lighting units to receive and collimate light emitted by said lighting units, and the brightness enhancing means may be arranged on this collimator to receive and further collimate the light emitted by the lighting units.

In embodiments of the present invention, each lighting unit may comprise one or more light emitting diodes.

In some embodiments of the present invention, the lighting units may comprise one or more organic light emitting diodes (OLED).

In embodiments of the present invention, the first lighting unit comprises a first linear array of two or more light emitting diodes and the second lighting unit comprises a second linear array of two or more light emitting diodes, where the second array may be arranged essentially parallel to the first array.

In embodiments of the present invention, the output of light at a peripheral boundary of said device is at least partly reduced. The output reduction may for example be obtained by arranging a light-blocking means on at least part of the output areas of at least part of the collimating means located at a peripheral boundary of said brightness enhancing means, thus at least partly preventing light to exit the device through these output areas. Alternatively, or in addition, the output reduction may be obtained by reducing the flux of light emitted by at least part of the lighting units located at a peripheral boundary of said device.

In embodiments of the present invention, a light-emitting device may further comprise a wave-guide, wherein the brightness enhancing layer is arranged to couple light emitted by said at least first and second lighting units into said waveguide.

In further aspects, the present invention provides lightsources and display devices comprising a brightness enhancing means of the present invention.

These and other aspects of the present invention will now be described in more detail, with reference to the appended drawings showing a currently preferred embodiment of the invention.

FIGS. 1a-b illustrate, in cross sectional view, a first embodiment of the present invention. FIG. 1b is a detail of FIG. 1a. FIG. 1c is an alternative embodiment for the detail of FIG. 1b.

Figure 1A:
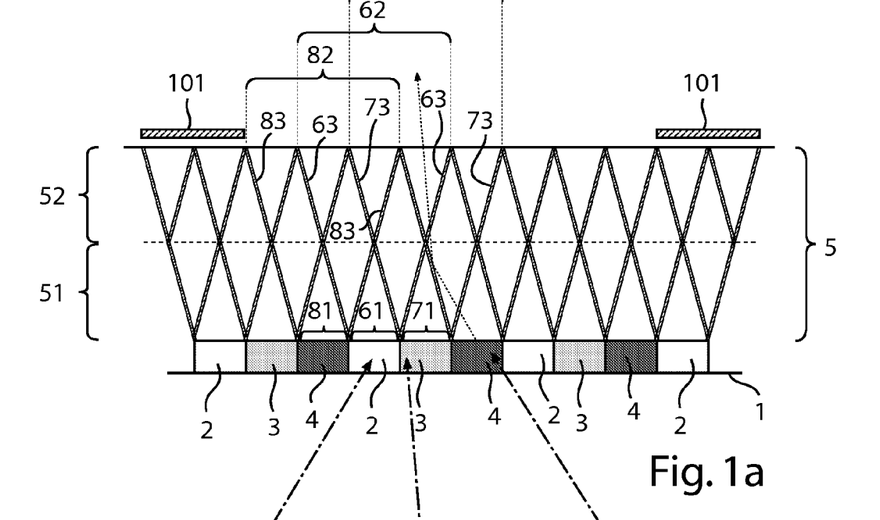

An embodiment of a brightness enhancing means of the present invention is illustrated in FIG. 1a, which shows a cross-sectional view of this embodiment in the context of a light-emitting device according to the present invention, which comprises a brightness enhancing means.

A brightness enhancing means, in the context of the present invention, is an optically active element, which is, or is adapted to be, arranged on a light-emitting device in order to increase the brightness and color mixing of light emitted by the device.

The brightness (B) is defined as being the amount of lumens ($\Phi$) emitted per unit of area (A) and per unit of solid angle ($\Omega$):

$$B = \frac{\Phi}{A\Omega}.$$

With the present invention, the emitting area A, i.e. the area of the light source, may be left unaltered. However, the angular spread is reduced, i.e. the light is collimated. By means of dichroic filters, the angular spread is reduced and therefore the solid angle $\Omega$ subtending the emitted light is reduced. As a result, the brightness is increased.

The light-emitting device comprises a substrate 1 on which an array of light-emitting diodes is arranged. The array comprises a first, red light emitting diode 2, a second, green light emitting diode 3 and a third, blue light emitting diode 4 arranged on the substrate 1 and electrically connected to a circuitry (not shown).

As used herein, "light-emitting diodes" relates to all different types of light emitting diodes (LEDs), including organic based LEDs, polymeric based LEDs and inorganic based LEDs, which in operating mode emits light of any wavelength or wavelength interval, from ultra violet to infrared. Light emitting diodes, in the context of this application, are also taken to encompass laser diodes, i.e. light emitting diodes emitting laser light. Light emitting diodes suitable for use in the present invention include, but are not limited to, top-emissive, side-emissive and bottom-emissive light emitting diodes.

As used herein, the term "organic light-emitting diodes" or "OLEDs" relates to all different types of light emitting diodes (LEDs) comprising an organic light-emitting material, including small organic molecule based LEDs (smOLEDs) and organic polymer based LEDs (polyLED), which in operating mode emits light of any wavelength or wavelength interval, from ultra violet to infrared. Also transparent top-emissive, bottom-emissive or both top- and bottom-emissive OLEDs (TOLEDs), may be used as light sources in the present invention.

Organic light emitting diodes (OLEDs) typically consist of one or more organic layers, of which at least one can emit light, sandwiched between an anode and a cathode. OLEDs are suitable as light sources for large surface luminant panels for illumination.

One of the bottlenecks in using OLEDs for general illumination is the non-directed out coupling of light, making an OLED a source of diffused light. Therefore, for many illumination applications it is not presently efficient to use OLEDs.

A second problem of OLEDs is caused by their limited lifetime. Typically, the luminance at constant driving current decreases as a function of time. Moreover, the OLEDs typically degrade faster at higher current densities (i.e. higher luminance). Presently, the lifetime of OLEDs is, even at relatively low luminance levels, insufficient to enter the lighting market. In addition, OLEDs of different colors often have different aging properties, causing multicolor arrays (i.e. an RGB array) of OLEDs to exhibit not only luminance, but also color-shifts over time.

Thirdly, color mixing in color variable OLED devices is a problem. One option of a color variable device is to make a patterned device with for example red, green and blue monochromic OLEDs positioned laterally.

However, efficient color mixing puts restrictions on the pattern sizes. Smaller patterns, i.e. denser packing of OLEDs, typically yields better color mixing, but with a smaller pattern comes a more complex circuitry for driving the OLEDs. Although it is also possible to stack the monochromic OLEDs, this is cost ineffective.

One alternative in order to decrease the degree of diffusion of light emitted by OLEDs is to collimate the light and thereby decrease the angular spread.

A decreased angular spread could also increase the brightness of the emitted light, and thus improve the lifetime of the OLEDs, since a relatively lower driving current could be used to achieve the same brightness. A brightness enhancing means layer of the present invention is therefore advantageously used together with organic light emitting diodes.

As used herein, the color of a light emitting diode, e.g. a "green light emitting diode", refers to the color, i.e. the wavelength range of the light emitted by the light emitting diode in operational mode.

As mentioned above in the summary, the inventive idea of the present invention also reaches out to the mixing and collimation of different polarization properties. Thus, in appropriate passages of the description herein, the term "wavelength interval" may be substituted by "polarization state", "dichroic filter" may be substituted by "polarization filter" and "color" may be substituted by "polarization"

The brightness enhancing means 5 comprises a receiving face and an output face, opposite to the receiving face, and is arranged on top of the light emitting diodes to receive at least part of the light emitted by the light emitting diodes via its receiving face.

The brightness enhancing means comprises an array of light collimating means 6, 7, 8, each having a receiving area 61, 71, 81 at the receiving face of the brightness enhancing means 5 and an output area 62, 72, 82 at the output face of the brightness enhancing means 5.

Further, each light collimating means comprises sidewalls 63, 73, 83 extending between the receiving area and the output area of the corresponding light collimating means.

Figures 1B, 1C:
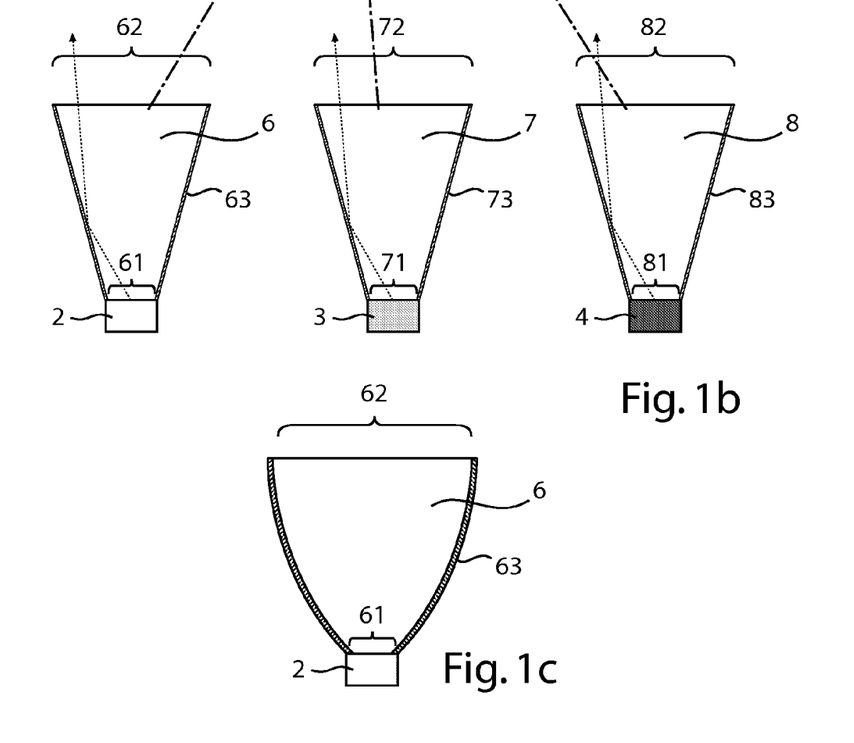

The collimating means 6, 7 and 8 are illustrated in detail in FIG. 1b.

In the present invention it is advantageous that portions of sidewalls of a collimating means facing a light emitting diode adjacent to the light emitting diode, to which the collimating means corresponds, comprises a dichroic filter that reflects light of the color emitted by its corresponding light emitting diode, but transmits light of the color emitted by the adjacent light emitting diode.

The collimating means have a generally funnel-like shape in at least one dimension, and by utilizing dichroic filter materials as sidewalls on the tapered portions, an overlap of the output areas is possible without essentially affecting the collimation efficiency of each funnel.

This overlap allows a dense packing of the light emitting diodes on the substrate, in turn allowing higher brightness to be produced by a light-emitting device of the present invention, as compared to a light-emitting device using non-overlapping collimation means, when using the same type of light emitting diodes.

The overlap of the output areas of two adjacent collimating means is at least 10%, such as at least 30%, for example at least 50%, counted as the portion of the output area of one collimating means being overlapped by one adjacent collimating means.

The overlap of output areas also provides a good color mixing of the emitted light from adjacent light emitting diodes. In the overlapping portions of the output area, an essentially total color mixing is achieved.

The higher the overlap is between adjacent output areas, the better the color mixing becomes.

As used herein, the term "collimator" and related terms, such as "collimating means" refers to an element that is capable of receiving electromagnetic (EM) radiation, e.g. light in the interval from UV to IR, and reduce the collimation angle of the received EM-radiation.

The array of light collimating means is superimposed on the array of light emitting diodes, such that each collimating means receives light from a separate light emitting diode.

In some cases, a plurality of light emitting diodes are grouped together into a lighting unit, such that the brightness enhancing means is arranged on an array of lighting units, where each lighting unit comprises more than one light emitting diode, where each such lighting unit corresponds to one light collimating means of the brightness enhancing means.

The sidewalls of the collimating means comprise a dichroic filter, which is adapted to reflect light of essentially the same color (wavelength or wavelength range) as the light emitted by its corresponding light emitting diode.

As used herein, the term "dichroic filter" relates to a filter that reflects electromagnetic radiation of one or more wavelengths or wavelength ranges, and transmits wavelengths or wavelength ranges, while maintaining a low, typically nearly zero, coefficient of absorption for all wavelengths of interest.

A dichroic filter may be of high-pass, low-pass, band-pass or band rejection type.

As used herein, the term "wavelength range" refers to both continuous and discontinuous wavelength ranges.

Dichroic filters suitable for use in a brightness enhancing means of the present invention include dichroic filters known to those skilled in the art, and include a multilayer of materials that differ in the index of refraction.

One example of such dichroic filters, commonly known as "interference stacks" comprise alternating layers of $Ta_2O_5$ and $SiO_2$. The thickness of each layer is typically approximately equal to a quarter of the wavelength in air divided with the index of refraction, where the wavelength in air equals the dominant wavelength of the light for which the dichroic filter is adapted.

Other examples of dichroic filters known to those skilled in the art and suitable for use in the present invention are such filters based on cholesteric liquid crystals, so called photonic crystals or holographic layers.

As used in the context of the present invention, a dichroic filter is matched to a lighting unit if the dichroic filter reflects wavelengths in the wavelength range emitted by the lighting unit while transmitting light of a different wavelength range.

For example, a dichroic filter adapted for green light may reflect green light while transmitting blue and red light.

It is not necessary that the emitted wavelength range and the reflected wavelength range are identical. The reflected wavelength range may for example be narrower than the emitted wavelength range, or may be broader than the emitted wavelength range.

Further, the dichroic filters may be non-ideal, i.e. not reflecting 100% of the light in the wavelength range in which the filter is to reflect light. Thus, the term "dichroic filter arranged to reflect light in a wavelength interval" is to be taken as "dichroic filter arranged to at least partially reflect light in a wavelength interval".

For example, a dichroic filter may be matched to lighting units of two different colors, for example red and green, transmitting blue light, etc.

Each collimating means 6, 7, 8 has a funnel-like shape, such that the output area is greater than the receiving area, and the cross-section area of each collimating means (as viewed from above) is continuously increasing with the distance from the receiving area.

In the embodiment shown in FIGS. 1a and b, the sidewalls 63, 73 and 83 of the collimating means 6, 7 and 8, respectively are essentially flat, i.e. the angle between the normal to the receiving area and the normal to the sidewall is essentially constant with the distance from the lighting unit. Typically, this angle is in the range of from 45° to 89°, such as from 60° to 85°, for example from 75 to 85°.

However, in some applications, it may be advantageous if this angle between the normal to the receiving area and the normal to the sidewall varies, for example increases or decreases with the distance to the receiving area, for example increases to form a parabolic or hyperbolic like shape. In FIG. 1c, such a collimating means 6 is shown where the sidewalls 63 have a parabolic like shape. As will be appreciated by those skilled in the art, such a parabolic-type shape is also applicable on the collimating means 7 and 8 in FIG. 1b. With a parabolic-like shape, the angle between the light emitted by the LED and the sidewall at the location for dichroic reflection is less depending on the emission angle. This leads to a better performance as the dichroic filter in general is dependent on the angle of incidence, i.e. the reflection and transmission bands, in context of wavelength intervals, changes with the angle of incidence. The maximum angle between the normal to the receiving area and the normal to the sidewall is typically in the range of from 45° to 89°, such as from 60° to 85°, for example from 75 to 85°.

In the embodiment shown in FIG. 1, the portions of the sidewalls comprising dichroic filters are tapered outwards, towards the output area. Thus, light from a light emitting diode, entering its corresponding collimating means via its receiving area, will be reflected in the dichroic filter towards the output area of the same collimating means, in case the light enters the collimating means at such an angle that it encounters the tapered sidewall before it encounters the output area.

As the dichroic sidewalls are tapered outwards, the absolute angle between the normal to the receiving area and a reflected light beam (reflected against a side wall) will be smaller than the absolute angle before the light beam is reflected.

Thus, the light encountering the output area will be collimated with respect to the received light.

However, one requisite for the reflection of light to take place in a portion of a sidewall comprising a dichroic filter is that the color of the light is matched to the dichroic filter. If the color of the emitted light is not matched to the dichroic filter, it will be transmitted by the filter. As mentioned above though, dichroic filters may be adapted for reflection of more than one color, for example red and green, while transmitting blue light, or virtually any other combination of colors.

The light collimating means corresponding to two adjacent light emitting diodes of different colors, i.e. having essentially non-overlapping spectra, for example the collimating means 6 and 7, corresponding to the light emitting diodes 2 and 3, are arranged such that the output areas 62 and 72 respectively, are overlapping.

As the dichroic filter of the collimating means 6 is essentially transparent to the (green) light emitted by the green light emitting diode, and vice versa, this overlap does essentially not result in any reflection of light back towards the light emitting diodes.

In the embodiment shown in FIG. 1, the sidewalls of the collimating means are constituted by self-supporting wall elements. The wall elements are arranged in a first layer 51 directly on top of the LED-array, and a second layer 52 arranged on the first layer 52.

The first layer is arranged on the LED-array such that a triangular void is located directly above each LED.

The walls delimiting the void above a certain LED constitute part of the sidewalls of the collimating means corresponding to adjacent LEDs. Thus, as illustrated in FIG. 1, the left wall delimiting the void above the red LED 2 is part of the sidewall 83 of the collimating means 8, corresponding to the blue LED 4, arranged to the left of the red LED 2. Analogous, the right wall delimiting the void above the red LED 2 is part of the sidewall 73 of the collimating means 7, corresponding to the green LED 3, arranged to the right of the red LED 2.

The second substrate 52 is arranged on the first substrate 51 such as to form linear extensions of the walls formed by the first substrate 51.

Dichroic material, as described above, is arranged on the self-supporting wall elements in order to provide the dichroic filter functionality.

One approach of the manufacture of such a brightness enhancing means is to provide two planar transparent foldable substrates. The first substrate is provided with dichroic material, such that when it is folded into a W-like shape, it takes the shape of the first layer 51 in FIG. 1. The second substrate is provided with dichroic material, such that when it is folded into a W-like shape, it takes the shape of the second layer 52 in FIG. 1. The two folded substrates are then superimposed on the LED array in order to provide a brightness enhancing means.

In the embodiment shown in FIG. 1, essentially each collimating means 6,7,8 of the brightness enhancing means has the same shape. Further, they exhibit an essentially symmetrical cross-section (a truncated triangle) where the geometrical center of the input area and the geometrical center of the output area is located essentially on top of each other (a line between the geometrical center of the input area and the geometrical center of the output area is parallel to the normal of the input area). However, in alternative embodiments of the present invention the shape of the collimating means may differ between adjacent collimating means. For example, the angle between the normal of the input area and a line, which line is between the geometrical center of the input area and the geometrical center of the output area, may be different for adjacent collimating means. Typically the absolute value of this angle is higher for collimating means located near a peripheral boundary of the brightness enhancing means (such that the line leans towards the boundary) and lower for collimating means located near the center of the brightness enhancing means.

In an embodiment where the dichroic filters constitute or are arranged on free standing, self supporting wall elements, like in FIG. 1, it may be advantageous to arrange dichroic material, such as in interference stack both sides of the wall element in order to achieve improved filtering properties. The dichroic material on the different sides of the wall element may be the same or different, in order to obtain good filtering properties. For example, a first interference stack, as described above, of 5-50, e.g. about 15, layers may be arranged on a first side of a wall element, and a second interference stack of 5-50, e.g. about 15, layers may be arranged on a second, opposing side of the same wall element.

As an alternative to the self supporting wall elements as dichroic filters or as substrates for dichroic filters, arrays of solid transparent prisms may be arranged on the array of LEDs, where the sides of the prisms are provided with dichroic material to form the sidewalls of the collimating means.

However, it is not in all embodiments necessary for the brightness enhancing means to comprise two superimposed substrates as described above. Thus, the second substrate 52 in FIG. 1 may in some embodiments be omitted. For example, in a brightness enhancing means adapted for a two-color array of alternating first and second color lighting units, good collimation and color mixing may be achieved from a brightness enhancing means obtainable from one substrate. In such a brightness enhancing means, a lighting unit of a first color is located between two lighting units of a second color. Here, sidewalls of the collimating means corresponding to the two lighting units of the second color intersect above the lighting unit of the first color. In the same way, a lighting unit of the second color is located between two lighting units of a the color, and the sidewalls of the collimating means corresponding to two lighting units of the first color intersect above the lighting unit of the second color (as in FIG. 1 with substrate 52 omitted, and where the array of lighting units 2, 3, 4 is an array of alternatively lighting units of a first color and a second color).

Figure 2:
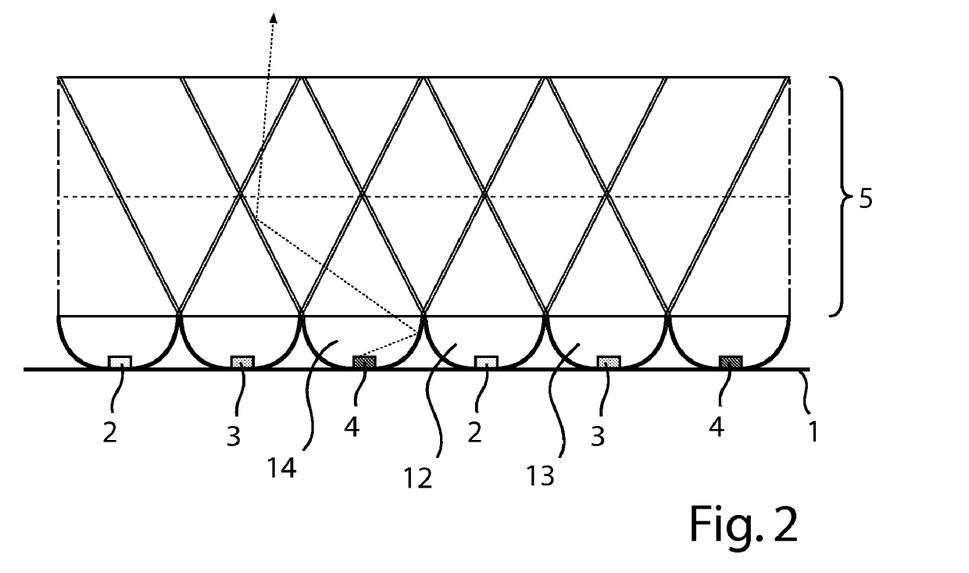
FIG. 2 illustrates, in cross sectional view, a second embodiment of the present invention for improved collimation of the light.

Another exemplary embodiment of the present invention is illustrated in FIG. 2, showing a variant of the embodiment in FIG. 1, where the light emitting diodes 2, 3 and 4 are arranged spaced apart on the substrate 1 in collimating cups 12, 13 and 14, respectively.

The collimators 12-14 fill up the space between the light emitting diodes 2-4. The brightness enhancing means 5 is then arranged on top on the collimators, to further collimate the light emitted by the light emitting diodes.

Figure 3:
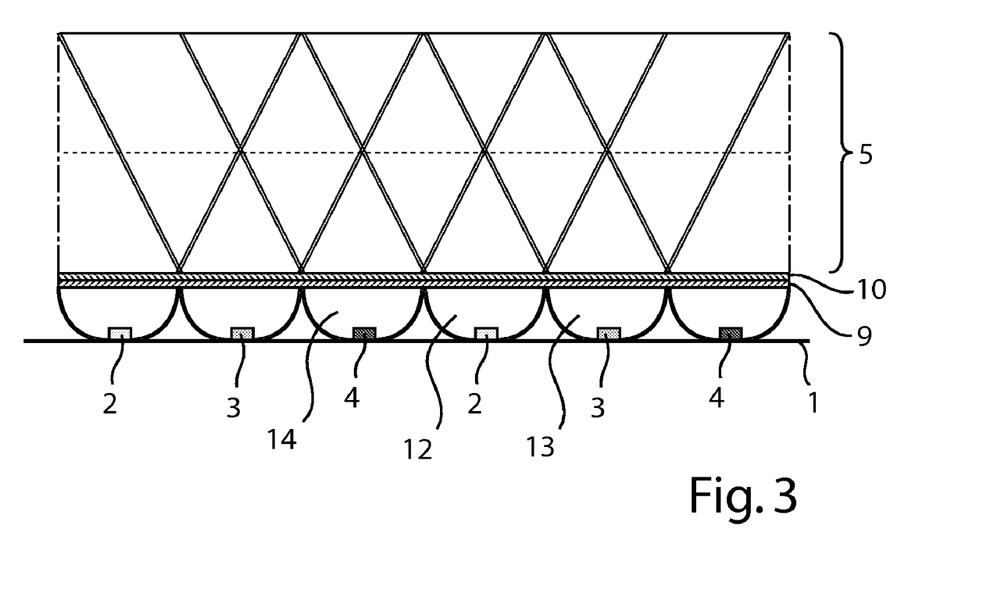
FIG. 3 illustrates, in cross sectional view, a third embodiment of the present invention for providing polarized light.

Yet another embodiment of the present invention is illustrated in FIG. 3, showing a light-emitting device for providing polarized light. In this embodiment, a retarder plate 9 and a reflective polarizer 10 is arranged between the light emitting diodes and the brightness enhancing means.

As used herein, the term "retarding plate" and related terms refer to an optically active element, which has principal optical axes, one slow and fast. In the emerging beam, the components of polarization along the optical axes are phase shifted with respect to each other.

The light emitted by a light emitting diode 2 travels through the retarder plate 9, the main axes of which are preferably oriented at an angle of 45° with respect to the main axis of the polarizer 10. The reflective polarizer 10 transmits light of a certain polarization towards the brightness enhancing means 5, whereas the complementary fraction of light is reflected down towards the light emitting diode 2 and the collimator 12. The returning light is reflected in the reflected surface of the collimator 12 and LED and is once again passed through the retarder plate 9 and, if it has the correct polarization, through the reflective polarizer towards the brightness enhancing means 5.

The retarder plate 9 may for example be a quarter wave plate or any other suitable retarder plate, which in combination with the reflective polarizer 10 and the reflective collimator gives a high yield of polarized light being transmitted into the brightness enhancing means.

When using the embodiment above, typically 60-70% of the randomly polarized light emitted by the LED is transmitted, having the desired polarization, into the brightness enhancement means.

In an alternative to this embodiment, the retarder plate 9 and the reflective polarizer 10 are arranged on the output areas of the brightness enhancing means 5.

In general, a brightness enhancing means of the present invention may be used to receive and collimate light from a one-dimensional array, such as a linear array, of lighting units or a two-dimensional array.

The shape and assembly of the brightness enhancing means will depend on the layout of the array of lighting units.

In embodiments of the present invention, it is not necessary that the entire sidewalls of a collimating means comprise a dichroic filter.

For example, as is the fact in the embodiments shown in FIGS. 2 and 3, it may not be necessary that portions of the sidewalls closest to the receiving area comprise a dichroic filter.

Other examples of where it may be advantageous that portions of the sidewalls of collimating means does not comprise dichroic filter include peripheral boundaries of a brightness enhancing means, where there is no adjacent collimating means in at least one direction. At the boundaries of a brightness enhancing means, the portions of the sidewalls forming or facing the peripheral boundary may for example be a full spectrum reflector, such as a metallic film in order to reflect light of essentially all wavelengths out from the device, or may for example be an absorber.

Figure 4:
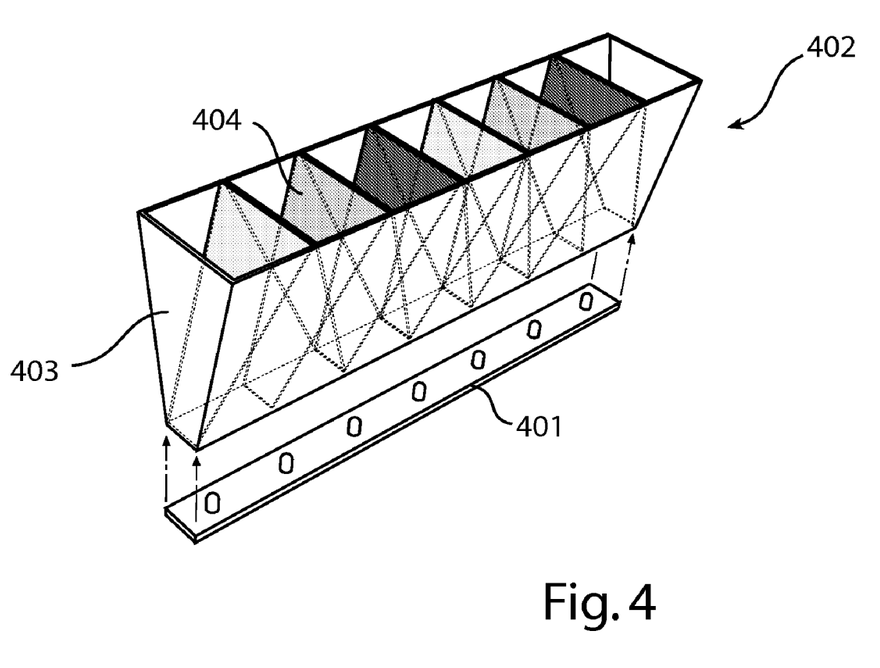
FIG. 4 illustrates, in perspective view, a fourth embodiment of the present invention.

One example of such a brightness enhancing means is shown in FIG. 4, illustrating a light-emitting device with a linear light source, being an implementation of the embodiment shown in FIG. 1. Here, the light emitting diodes are arranged in a one-dimensional array 401. The portions 403 of the sidewalls, which form the outer periphery of the brightness enhancing means 402, comprise a wide band reflecting material such that essentially no light is capable of escaping the device through these walls. On the contrary, light of any wavelength will be reflected in the peripheral walls 403 towards the output areas.

Such wide band reflecting walls may also be advantageous to optically delimit separate areas, such as adjacent pixels of a display device of the present invention, from each other.

However, the inner walls 404 of the brightness enhancing means 402, not forming the peripheral boundary, comprise dichroic filters, as described above.

The wide band reflecting walls forming the long edges of the brightness enhancing means may be tapered, such that also these walls acts as collimating walls, or may be essentially perpendicular to the receiving and output areas. In the former case, a two-dimensional collimation is obtained, and in the latter case, an essentially one-dimensional collimation is obtained.

A two dimensional array of light emitting diodes may for example be provided by arranging a plurality of one-dimensional arrays, each having a separate brightness enhancing means, or sharing a common brightness enhancing means. For example, several devices as illustrated in FIG. 4 may be arranged aligned parallel beside each other to each other to form a 2-dimensional array.

Figure 5:
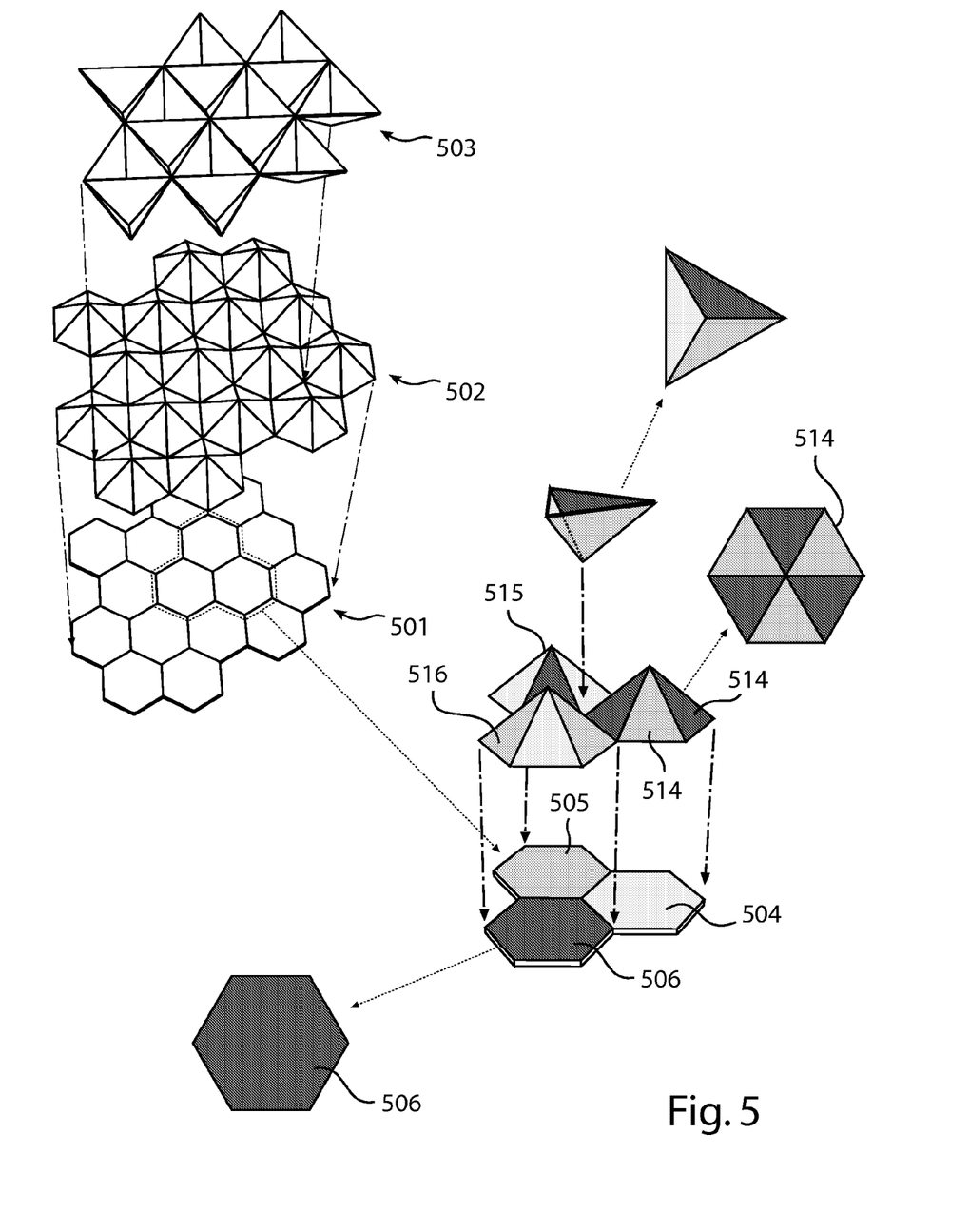
FIG. 5 illustrates a fifth embodiment of the present invention.
Figure 6A:
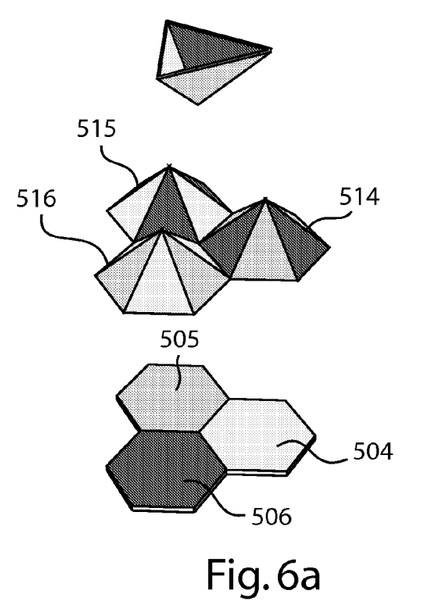
FIG. 6 is a detail of FIG. 5.
Figure 6B:
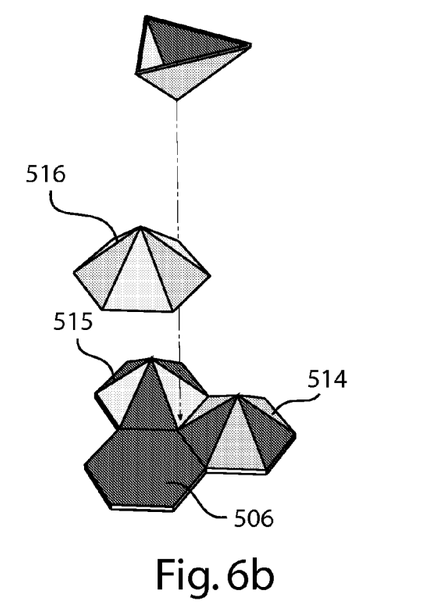
Figure 6C:
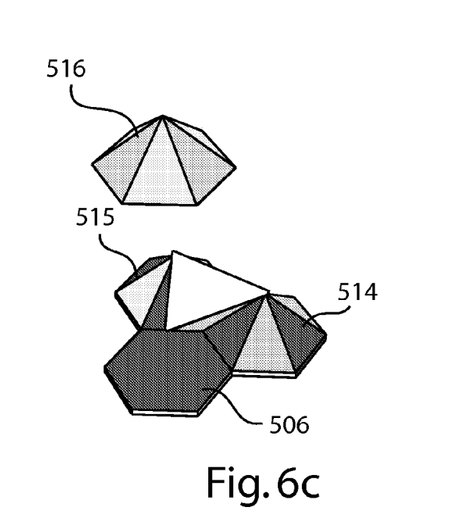
Figure 6D:
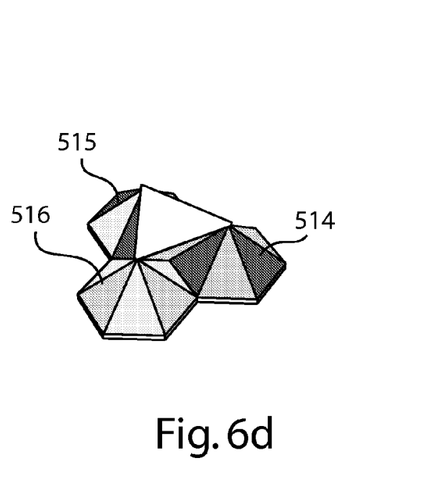

Another way of obtaining a two-dimensional brightness enhancing means is shown in FIGS. 5 and 6. This brightness enhancing means is adapted for a three-color, two-dimensional array 501 of lighting units 504, 505, 506 in hexagonal arrangement, which requires a more complicated assembly to provide the desired light collimation. In this embodiment, a first array 502 of hexagonal pyramids 514, 515, 516 is superimposed on top of the light emitting diodes, one pyramid on each light emitting diode, with the base of the pyramids facing the LEDs.

Dichroic filters are then arranged on the sides of the hexagonal pyramids. The dichroic filters are arranged on the sides such that a side that is adjacent to a LED and tapers away from that LED comprises a dichroic filter adapted for that LED.

A second array 503 of tetrahedral pyramids is provided. This second array of pyramids is arranged having a flat face and a structured face, the structured face facing the LEDs.

The second array 503 is superimposed on the first array of pyramids 502, such that the peak of a tetrahedral pyramid of the second array is located at an intersection between three hexagonal pyramids of the first array.

The structured face of the second array of pyramids is provided with dichroic material, such as to around each lighting unit form an essentially outwards tapered funnel of dichroic filters, having a hexagonal (6-sided) receiving area and output area (and a dodecahedral (12-sided) area between the receiving and output areas), that is adapted to the color emitted by the surrounded lighting unit.

Also in this embodiment, the dichroic filters may be formed on self supporting walls, as described above, forming the desired pyramid shapes.

As discussed herein above, one advantage of a brightness enhancing means of the present invention is that it provides a good color mixing. However, at the peripheral boundaries of the brightness enhancing means, the color mixing may be somewhat impaired, leading to a visible color shift, an "edge-effect" at these boundaries. For example in the embodiment shown in FIG. 1, an edge effect appears in the outermost collimation means, i.e. the collimation means at the peripheral boundary of the brightness enhancing means.

One major cause of the edge effect is due to that at the outermost part of the output area of the outermost collimation means, only light from the outermost lighting source exits the device. Thus, no color mixing appears in this area, giving rise to a color shift and an excess of the color of the light emitted by the outermost lighting source.

To avoid this edge effect it may be advantageous to reduce the excess of the light that give rise to this effect, i.e. to reduce the output of light from this outermost lighting source.

One approach to accomplish this is to arrange a light blocking means 101 on the portions of the output areas that give rise to the effect.

Thus, in embodiments of the present invention, a light-blocking means 101 is arranged on at least part of the output areas of collimating means located at a peripheral boundary of a brightness enhancing means of the present invention.

Alternatively, or in addition to the light blocking means, it may be advantageous to reduce the flux of light emitted from the outermost lighting units in order to reduce the color-shift at the peripheral boundaries, i.e. reduce the "edge-effect". This may be achieved in a plurality of manners, including reducing the current, which drives this lighting unit, reducing the light-emitting area of the lighting unit or using a lighting unit having a lower output of light.

Figure 7:
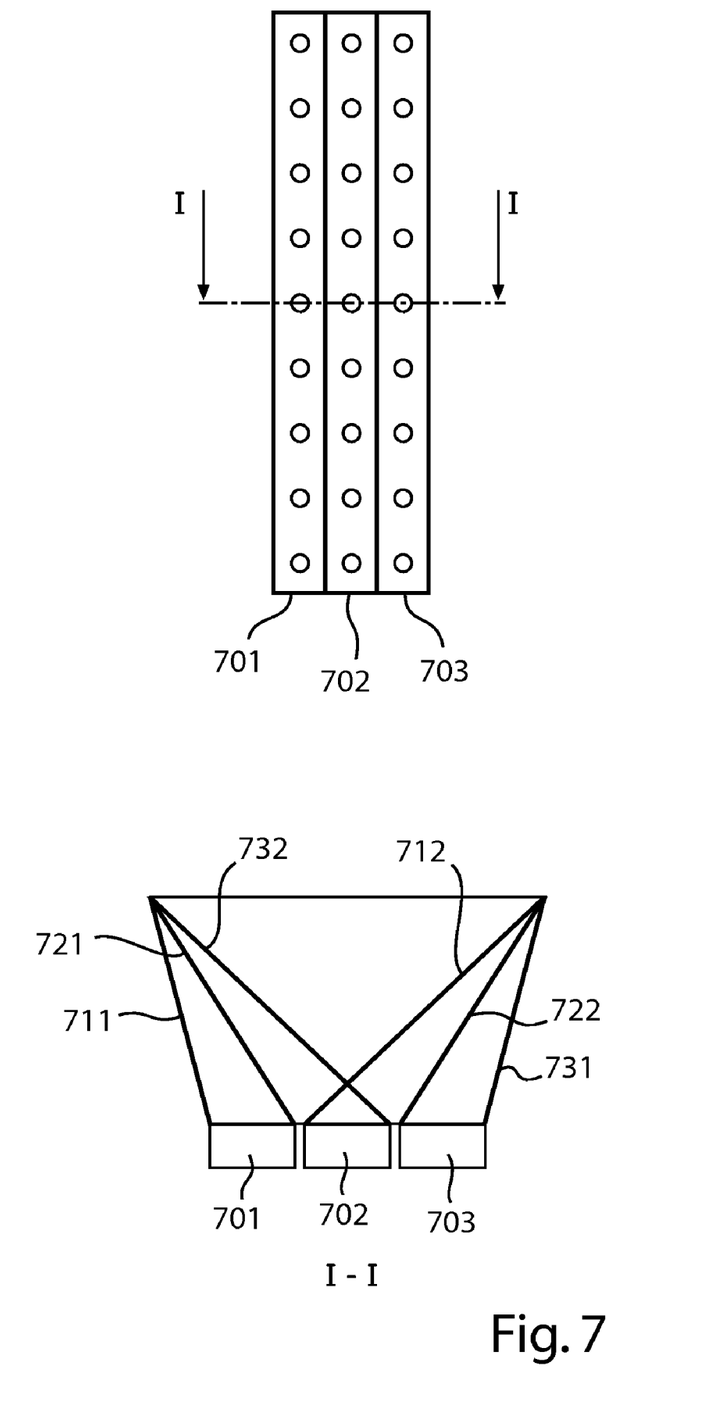
FIG. 7 illustrates, in top view and cross sectional view, another embodiment of the present invention.

Yet another embodiment of the present invention is illustrated in FIG. 7 and comprises three parallel linear arrays of light emitting diodes; one array 701 of red LEDs, one array 702 of green LEDs and one array 703 of blue LEDs. A brightness enhancing means is arranged on the arrays.

The light from the red LEDs 701 is collimated by a collimating means defined by the sidewalls 711 and 712, the light from the green LEDs 702 is collimated by a collimating means defined by the sidewalls 721 and 722, and the light from the blue LEDs 703 is collimated by a collimating means defined by the sidewalls 731 and 732.

In this embodiment, the sidewall 711 should reflect red light, but may also reflect light of any other color, and the sidewall 712 should reflect red light. The sidewall 721 should reflect green light, but may also reflect blue light, and the sidewall 722 should reflect green light but may also reflect red light. The sidewall 731 should reflect blue light but may also reflect light of any other color, and the sidewall 732 should reflect blue light.

Notably in this embodiment, the output areas of the three different collimating means overlap to essentially 100%.

Here, the output areas of the three collimating means closest to a peripheral boundary of said brightness enhancing means, taken in a direction perpendicular to said peripheral boundary, at least partly coincide with said peripheral boundary.

The sidewalls 711, 721 and 732 all meet at the peripheral boundary of the brightness enhancing means that is defined by the sidewall 711. Thus, the limits of the output areas of the three collimating means coincide with this peripheral boundary.

In addition, the sidewalls 712, 722 and 731 all meet at the peripheral boundary of the brightness enhancing means that is defined by the sidewall 731. Thus, the limits of the output areas of the three collimating means coincide with this peripheral boundary.

By arranging the sidewalls 711, 721 and 732 such that output areas of the three collimating means corresponding to these sidewalls extend to the peripheral boundary of the brightness enhancing means defined by the sidewall 711, a good color mixing is obtained over the total output area of the device, even at this peripheral boundary. The above mentioned edge effect is reduced due to that efficient color mixing is provided throughout the extent of the outermost collimation means, i.e. the collimation means defined by the sidewalls 711 and 712.

Correspondingly, a good color mixing is provided at the peripheral boundary defined by the sidewall 731.

Figure 8:
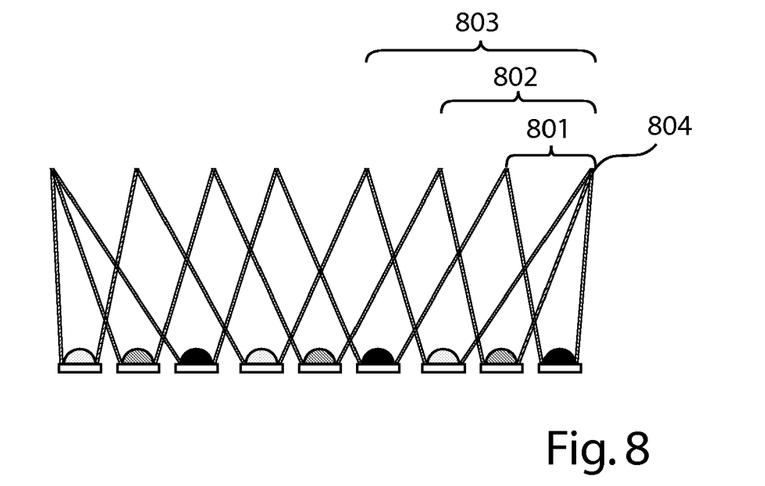
FIG. 8 illustrates, in cross sectional view, yet another embodiment of the present invention.

As will be realized by those skilled in the art, a device as shown in FIG. 7 is not limited to the use of three lighting units. For example a device comprising more than three lighting units, for example devices as illustrated in FIG. 1 or 4, may also make use of this approach of obtaining good color mixing at the peripheral boundaries of the brightness enhancing means, by arranging the collimating means of the brightness enhancing means such that the output areas of the two or more collimating means located closest to a peripheral boundary, taken in a direction perpendicular to the boundary, extends to the peripheral boundary, i.e. the limits of these two or more output areas partly coincide with the peripheral boundary. This is illustrated in FIG. 8 for a three color array, where the output areas of the three collimating means 801, 802 and 803 located closest to the peripheral boundary 804 coincide with the peripheral boundary 804. For a four-color array, typically the output areas of the four outermost collimating means should coincide with the peripheral boundary. For a two-color array, typically the output areas of the two outermost collimating means should coincide with the peripheral boundary.

As illustrated in FIG. 7, each lighting unit in a light-emitting device of the present invention may very well comprise a plurality of light-emitting diodes. However, as will be appreciated by those skilled in the art, it is not necessary to use more than one light emitting diode in each lighting unit.

In addition, a plurality of devices of the invention may be arranged adjacent to each other.

Figure 9:
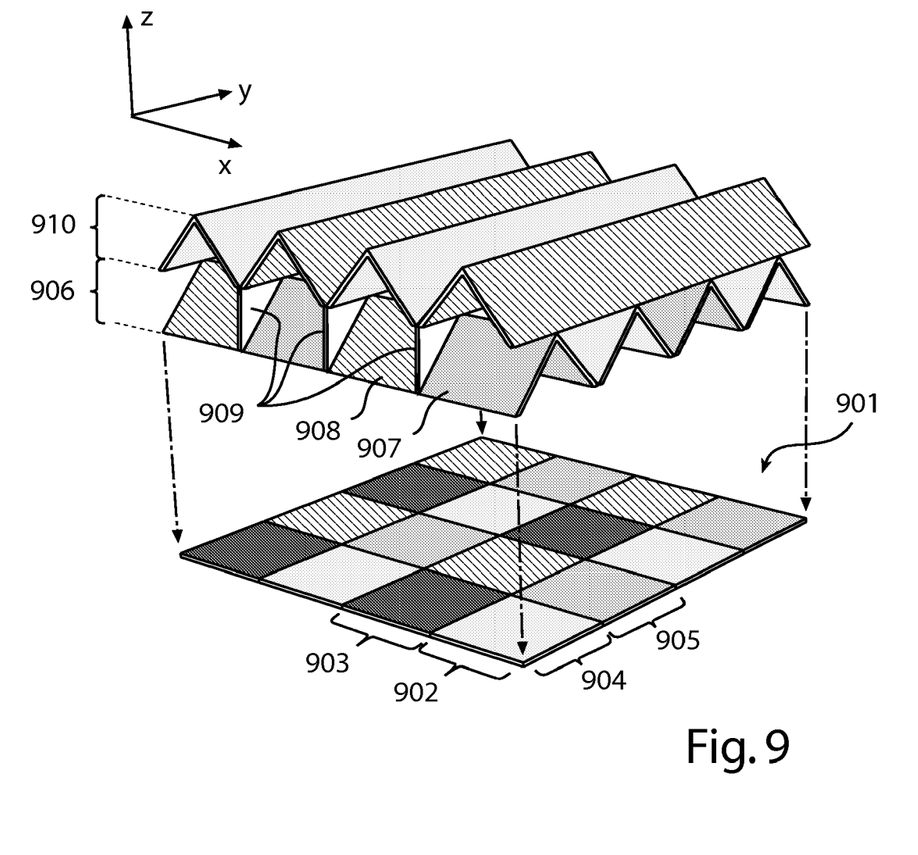
FIG. 9 illustrates, in perspective view, yet another embodiment of the present invention.

A four-color light emitting device and a brightness enhancing means adapted for this device is illustrated in FIG. 9. The light source array forms a row-column matrix 901. The first row 902 (and all 2n−1 rows (n=1, 2, 3 . . . )) in the matrix consists of alternating LEDs of the first and the second color. The second row 903 (and all 2n rows (n=1, 2, 3 . . . )) in the matrix consists of alternating LEDs of the third and the fourth color. Consequently, the first column 904 (and thus all odd columns) consist of alternating LEDs of the first and third color, and the second column 905 (and thus all even columns) comprises alternating LEDs of the second and fourth color.

A first layer of brightness enhancing means 906 is arranged on the LED matrix. In this first layer, the first row and all 2n−1 rows (n=1, 2, 3 . . . ) of LEDs is provided with a brightness enhancing means 907 adapted for collimation and color mixing of the first and second colors. The second row and all 2n rows (n=1, 2, 3 . . . ) of LEDs is provided with a brightness enhancing means 908 adapted for collimation and color mixing of the third and fourth colors. Reflective walls 909 are preferably arranged between adjacent collimating means (parallel to the rows in the LED matrix) in the first layer. This first layer of brightness enhancing means provides collimation and color mixing in the dimension of the rows (y-dimension), but essentially not in the dimension of the columns (x-dimension) in the LED matrix.

To provide collimation and color mixing in the dimension (x-dimension) of the columns of the LED matrix 901, a second layer 910 of brightness enhancing means is arranged on the top of the first layer 906 of brightness enhancing means.

This second layer 910 is a brightness enhancing means comprising collimating means of two types, where the first type reflects light of the first and second color, and the second type reflects light of the third and fourth color. The first type of collimating means has receiving areas corresponding to (located above) the 2n−1 rows 902 in the LED matrix, and the second type of collimating means has receiving areas corresponding to the 2n rows 903 (n=1, 2, 3 . . . ). Thus this second layer brightness enhancing means 910 provides collimation and color mixing in the dimension of the columns (x-dimension) of the LED matrix. Collectively, the first and the second layer of brightness enhancing means provides collimation and color mixing in both the dimension of the columns (x) and the rows (y) of the LED matrix.

In the embodiments shown in the figures, all lighting units (LEDs) are arranged at equal distance from each other, where the overlap between adjacent output areas is essentially the same over essentially the whole device. However, as will be appreciated by those skilled in the art, it is not necessary that the distance between adjacent lighting units and/or the overlap between adjacent output areas is equal over the whole device.

In embodiments of the present invention (not shown), the light-emitting device is divided into a plurality of subgroups, e.g. pixels. Each pixel comprises a plurality of lighting units, e.g. LEDs. In each of these sub-groups, the distance between adjacent lighting units is the same, and the overlap between adjacent output areas is the same. However, the distance between two adjacent lighting units, where the two are comprised in different sub-groups, is bigger than the distance inside a sub-group, and in addition, the overlap between the output areas corresponding to the two adjacent lighting units is smaller than the overlap inside a subgroup.

A brightness enhancing means of the present invention may be used to mix and couple the light emitted by an array of light emitting diodes into a wave-guide.

A light-emitting device of the present invention may comprise more than one brightness-enhancing means arranged on the light emitting diodes. For example when using certain types of LEDs, light is emitted from these in at least two general directions, and in such cases, it may be desired to use one brightness-enhancing means in each of those directions.

Additional optical elements may be used in conjunction with a device of the present invention. For example, a reflecting surface, such as a mirror or the like, may be arranged at the output areas of the brightness enhancing means in order to reflect light exiting the device into another general direction. For instance, in a case where two brightness enhancing means are arranged on an array of side emissive light emitting diodes to collect and receive light emitted in two opposite directions, the output areas of the two separate brightness enhancing means are facing in generally opposite directions. By arranging a mirror on the output areas of each of the brightness enhancing means, the angles of the mirrors may be chosen such that the reflected light from both the brightness enhancing means travels in generally the same direction.

Light-emitting devices of the present invention, or light-emitting devices comprising brightness enhancing means according to the present invention, may be used in several different applications. Such applications include, but are not limited to, linear light-sources, light-sources in high brightness lamps, such as room lightings, ambient lightings, stage lightings, traffic lights, vehicle lamps and backlights in LCD based display devices. The brightness enhancing means of the present invention may also be used on an LED display device, for example to direct the light from the LEDs and to obtain a good color mixing.

Another example is the use as light source in a projection LCD display.

A brightness enhancing means of the present invention may be used to mix and couple the light emitted by an array of light emitting diodes into a wave-guide, by arranging a wave-guide to receive light from the output areas of the brightness enhancing means.

A light-emitting device of the present invention may comprise more than one brightness-enhancing means arranged on the light emitting diodes. For example when using side emissive LEDs, light is emitted from these in at least two general directions. In such cases, it may be desired to use one brightness-enhancing means in each of those directions.

The person skilled in the art realizes that the present invention by no means is limited to the preferred embodiments described above. On the contrary, many modifications and variations are possible within the scope of the appended claims.

The above-mentioned embodiments mainly relates to a three-color array of LEDs. However, as will be apparent to those skilled in the art, a brightness enhancing means of the present embodiment may also be adapted to individually collimate light of more than three different colors. For example, an array of LEDs of four or more different colors may also be provided with a brightness enhancing means of the present invention, either where each different LED corresponds to a separate collimating means or where one collimating means corresponds to two or more LEDs of different colors.

The present invention is not limited to the use of light emitting diodes as the source of light. In addition, other light-emitting devices may be used, such as incandescent bulbs, discharge lamps, fluorescent tubes, etc.

The above-mentioned embodiments relates mainly to collimation and color mixing of light in the visible or near visible wavelength range (UV to IR). However, the brightness enhancing means of the present invention may also be for collimation of electromagnetic radiation outside this wavelength range, such as for example X-ray radiation, by choosing suitable dichroic filters.

What is claimed is:

1. A brightness enhancing means, comprising at least one collimating means having a receiving area, an output area being larger than said receiving area, and sidewalls at least partially extending between said receiving and output areas, wherein at least a portion of the side walls of said collimating means comprises a first filter being arranged to reflect light of a first light property, the light being received via said receiving area of said first collimating means, towards said output area of said collimating means, wherein
   said first light property is a first wavelength range and said first filter is a first dichroic filter, or
   said first light property is a first polarization state and said first filter is a first polarization filter.

2. A brightness enhancing means according to claim 1, comprising at least a first collimating means and at least a second collimating means, each having a receiving area, an output area being larger than said receiving area, and side walls at least partially extending between said receiving and output areas, wherein
   at least a portion of the side walls of said first collimating means comprises a first filter being arranged to reflect light of a first light property, which light is received via said receiving area of said first collimating means, towards said output area of said first collimating means,
   at least a portion of the side walls of said second collimating means comprises a second filter being arranged to reflect light of a second light property, which light is received via said receiving area of said second collimating means, towards said output area of said second collimating means,
   the output area of said first collimating means and the output area of said second collimating means are at least partly overlapping, and
   said first light property is different from said second light property.

3. A brightness enhancing means according to claim 2, wherein said first filter is a first dichroic filter, said first light property is a first wavelength range said second filter is a second dichroic filter, and said second light property is a second wavelength range.

4. A brightness enhancing means according to claim 2, wherein said first filter is a first polarization filter, said second filter is a second polarization filter, said first light property is a first polarization state and said second light property is a second polarization state.

5. A brightness enhancing means according to claim 1, wherein the angle between the normal to the receiving area and the normal to a portion of the side walls of a collimating means, which portion comprises a filter, is essentially constant with the distance from the receiving area.

6. A brightness enhancing means according to claim 1, wherein the angle between the normal to the receiving area and normal to a portion of the sidewalls of a collimating means, which portion comprises a filter, is increasing with the distance from the receiving area.

7. A brightness enhancing means according to claim 1, wherein the overlap of the output areas of two adjacent collimating means is at least 10%.

8. A brightness enhancing means according to claim 1, wherein said sidewalls comprises self-supporting wall elements.

9. A brightness enhancing means according to claim 8, wherein said filters comprises a first filter material arranged on a first side of said wall elements and a second filter material arranged on a second side of said wall element.

10. A brightness enhancing means according to claim 1, wherein light-blocking means are arranged on at least part of the output areas of at least part of the collimating means located at a peripheral boundary of said brightness enhancing means.

11. A brightness enhancing means according to any of the preceding claims, wherein the limits of the output areas of at least the two collimating means closest to a peripheral boundary of said brightness enhancing means, taken in a direction perpendicular to said peripheral boundary, at least partly coincide with said peripheral boundary.

12. A brightness enhancing means according to claim 1, wherein at least parts of the sidewalls of collimating means located at a peripheral boundary of said brightness enhancing means, which parts coincide with said peripheral boundary, has a full-spectrum reflecting surface.

13. A light-emitting device comprising a first lighting unit for emitting light of a first light property and a second lighting unit for emitting light of a second light property arranged on a substrate, characterized in that said device further comprises a brightness enhancing means arranged to receive light emitted by said first lighting unit, said means comprising a collimating means having a receiving area, an output area being larger than said receiving area, and sidewalls at least partially extending between said receiving and output areas, and
   at least a portion of the side walls of said collimating means comprises a first filter being arranged to reflect light of said first polarization property, which light is received via said receiving area of said first collimating means, towards said output area of said first collimating means, wherein
   said first light property is a first wavelength range, said second light property is a second wavelength range and said first filter is a first dichroic filter, or
   said first light property is a first polarization state, said second light property is a second polarization state, and said first filter is a first polarization filter.

14. A light-emitting device according to claim 13, wherein said brightness enhancing means is arranged to receive light emitted by said first lighting unit and second lighting unit, and comprises at least a first collimating means and at least a second collimating means, each having a receiving area, an output area being larger than said receiving area, and side walls at least partially extending between said receiving and output areas,
   at least a portion of the side walls of said first collimating means comprises a first filter being arranged to reflect light of said first light property, which light is received via said receiving area of said first collimating means, towards said output area of said first collimating means,
   at least a portion of the side walls of said second collimating means comprises a second filter being arranged to reflect light in said second light property, which light is received via said receiving area of said second collimating means, towards said output area of said second collimating means,
   the output area of said first collimating means and the output area of said second collimating means are at least partly overlapping, and
   said first light property is different from said second light property.

15. A brightness enhancing means according to claim 14, wherein said first filter is a first dichroic filter, said second filter is a second dichroic filter, said first light property is a first wavelength range and said second light property is a second wavelength range.

16. A brightness enhancing means according to claim 14, wherein said first filter is a first polarization filter, said second filter is a second polarization filter, said first light property is a first polarization state and said second light property is a second polarization state.

17. A light-emitting device according to claim 13, wherein said brightness enhancing means is wherein the angle between the normal to the receiving area and the normal to a portion of the side walls of a collimating means, which portion comprises a filter, is essentially constant with the distance from the receiving area.

18. A light-emitting device according to claim 13 wherein a retarder is arranged on said lighting units, a polarizing reflector is arranged on said retarder, and said brightness enhancing means are arranged on said polarizing reflector.

19. A light-emitting device according to claim 13, wherein said substrate is a reflective substrate.

20. A light-emitting device according to claim 13, wherein a collimator is arranged on said lighting units to receive and collimate light emitted by said lighting units, and said brightness enhancing means is arranged on said collimator.

21. A light-emitting device according to claim 13, wherein said lighting units comprises light emitting diodes.

22. A light-emitting device according to claim 21, wherein said light emitting diodes comprises organic light emitting diodes.

23. A light-emitting device according to claim 21, wherein said first lighting unit comprises at least one light emitting diode and said second lighting unit comprises at least one light emitting diode.

24. A light-emitting device according to claim 23, wherein said first lighting unit comprises a first linear array of two or more light emitting diodes and said second lighting unit comprises a second linear array of two or more light emitting diodes, said first and second arrays being essentially parallel.

25. A light-emitting device according to claim 13, wherein the output of light at a peripheral boundary of said device is at least partly reduced.

26. A light-emitting device according to claim 25 wherein said output of light is reduced by reducing the flux of light emitted by at least part of the lighting units located at a peripheral boundary of said device.

27. A light-emitting device according to claim 13, further comprising a wave-guide, wherein said brightness enhancing layer is arranged to couple light emitted by said at least first and second lighting units into said wave-guide.

28. Display device comprising a brightness enhancing means according to claim 1 or a light-emitting device according to claim 13.

29. A projection display device comprising a brightness enhancing means according to claim 1 or a light-emitting device according to claim 13.

* * * * *